Oct. 10, 1933.   J. M. EHMER   1,930,421

PICTURE FILM, DIAPOSITIVE, AND THE LIKE FOR OPTICAL PROJECTION APPARATUS

Filed Dec. 26, 1930

J. M. Ehmer
INVENTOR

By: Marks & Clerk
Attys.

Patented Oct. 10, 1933

1,930,421

UNITED STATES PATENT OFFICE 1,930,421

PICTURE FILM, DIAPOSITIVE, AND THE LIKE FOR OPTICAL PROJECTION APPARATUS

Johann Michael Ehmer, Beierfeld, Germany

Application December 26, 1930, Serial No. 504,900, and in Germany November 15, 1930

1 Claim. (Cl. 88—26)

This invention relates to an optical-projection apparatus for use with target practice apparatus as described in U. S. Patent 1,848,795, said apparatus having a diapositive in the form of a miniature target which is to be projected on to a screen and consists in the provision of means co-operating with the inserted slides for closing the normally open circuit of the electric projection lamp.

The object of this arrangement is to save current and to prolong the useful life of the projection lamp, a saving of current and projection lamps and avoidance of unnecessary heating being particularly essential in an apparatus of this kind.

While any switching device capable of co-operation with the slides may be employed for the switching on and off of the light, a suitable arrangement consists in providing the slide carrier with a pair of contacts, and the slides with metal strips adapted to engage said contacts for closing the circuit.

The invention is illustrated in the accompanying drawing in connection with an arrangement for use with target practice apparatus wherein a diapositive in the form of a miniature target is projected on to a screen, a saving of current and projection lamps and avoidance of unnecessary heating being particularly essential in an apparatus of this kind.

Figure 1:
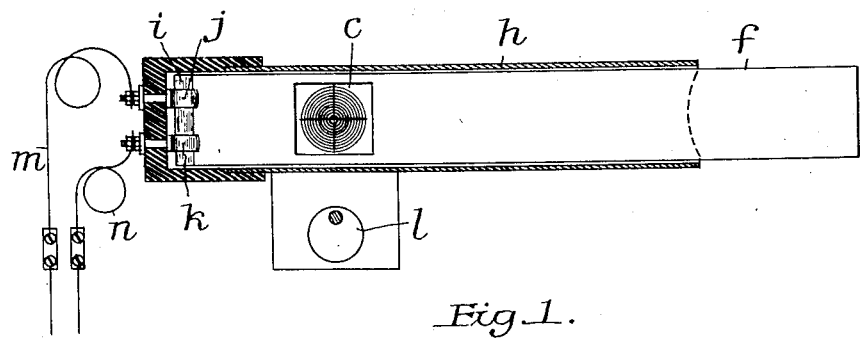
Figure 2:
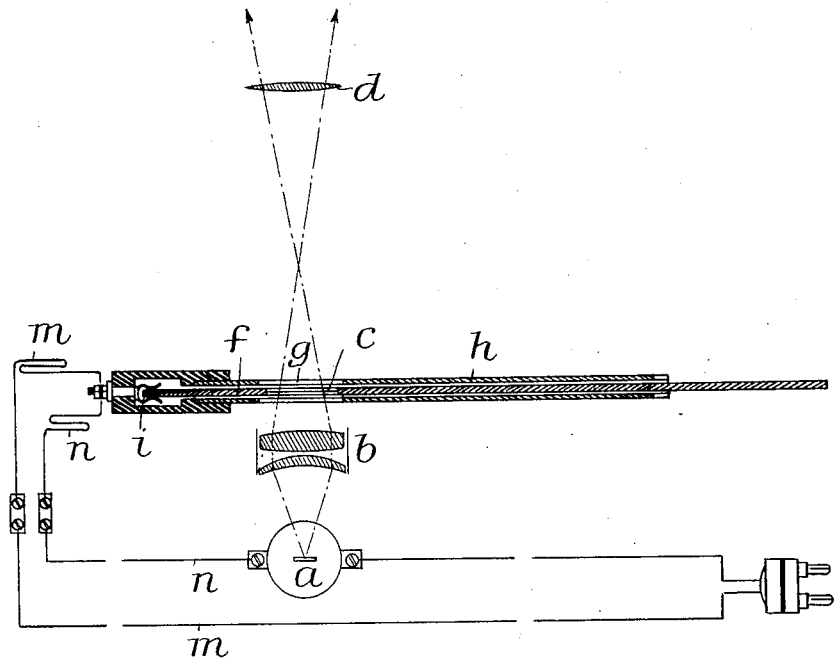

Fig. 1 represents a vertical section of the slide carrier fitted with electric contacts according to the invention, and Fig. 2 is a horizontal section of the arrangement including a diagram of the circuit.

The optical-projection apparatus comprises an electric projection lamp $a$, a condenser $b$, a slide carrier $h$ provided with a gate $g$, and an objective $d$. In the arrangement shown, the carrier is fitted with two spring clips $j$ and $k$ adapted to receive the inner end of the slide $f$ on the latter being inserted. The slide $f$ is made of cardboard or other stiff, electrically insulating material and has an aperture across which is stretched a diapositive $c$ having in the present instance the form of a miniature target. This target coincides with the gate $g$ of the carrier $h$ when the slide is held in the clips $j, k$. The electric leads $m, n$ of the lamp circuit are connected to the clips $j, k$ which are relatively insulated and which maintain the circuit normally open. The closing of the circuit is effected by the insertion into the carrier $h$ of the slide $f$, the inner end of which is covered with a metal strip $i$ adapted to form a connection between the two clips.

From this arrangement it follows that no current will pass through circuit except when a slide is inserted.

Those parts of the leads $m, n$ situated near the carrier may be made flexible to allow the carrier to be moved during the projection for instance by means of an eccentric $l$.

Closing of the circuit may, as an alternative, be effected by means of metal mounts fitted on the top and bottom edges of the slide and adapted to co-operate with contacts arranged in the path of the mounts above and beneath the slide.

The contacts $j$ and $k$ may be replaced by any other suitable switching device adapted to co-operate with the inserted slide for closing the circuit.

Apart from the lamp circuit, other circuits, for instance that of the motor employed to drive the device $l$, may be adapted to be closed by the insertion of the slide.

The electric leads may be arranged in any desired manner, and suitable modifications in form and dimensions of the different parts may be made within the scope of the invention.

What I do claim as my invention and desire to secure by Letters Patent is:

In an optical-projection apparatus for use with target practice apparatus having a diapositive in the form of a miniature target which is to be projected on to a screen, the combination with an electric projection lamp and a slide carrier provided with a gate, of a pair of electric contacts arranged in the lamp circuit and mounted on said slide carrier, a slide of stiff electrically insulating material having an aperture, a diapositive stretched across said aperture and held taut therein, and metal strips mounted on the slide adapted to connect the electric contacts on the slide carrier and close the lamp circuit when the slide is inserted into the carrier so that its diapositive registers with the gate in the slide carrier.

JOHANN MICHAEL EHMER.